Oct. 16, 1951  J. E. CUNNINGHAM ET AL  2,571,213
BOAT TRAILER
Filed May 29, 1947  2 Sheets-Sheet 1
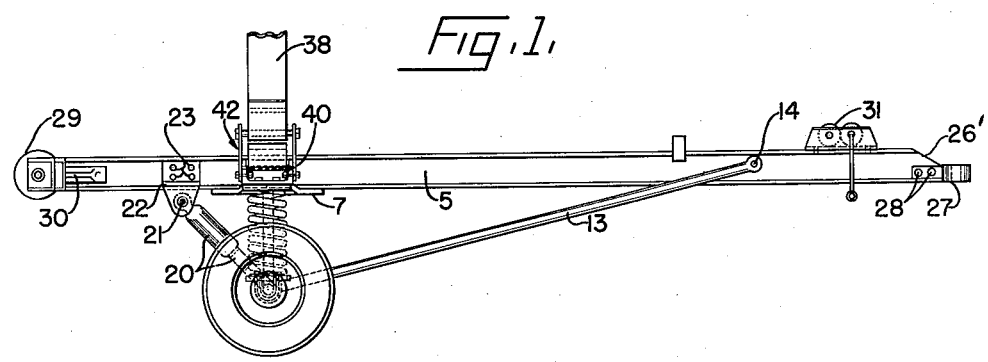
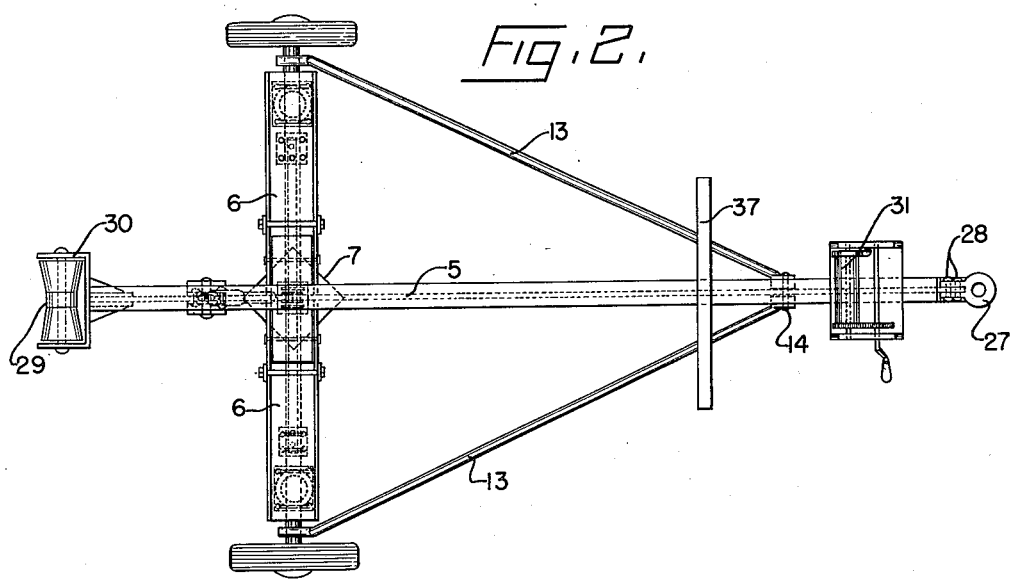
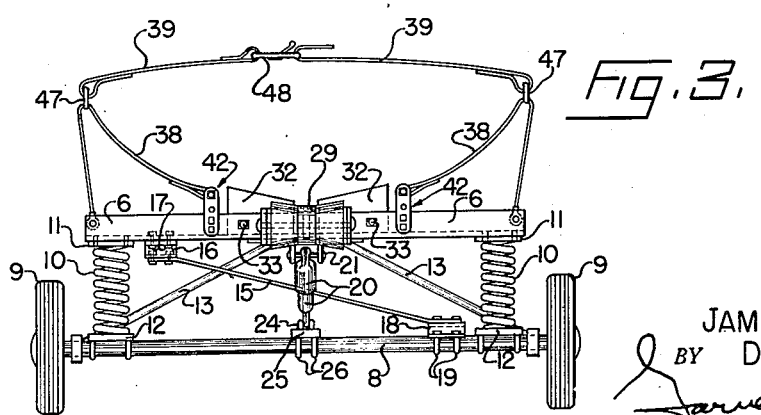
*INVENTORS.*
JAMES E. CUNNINGHAM.
BY  DONALD R. COMBS.
ATTORNEYS.

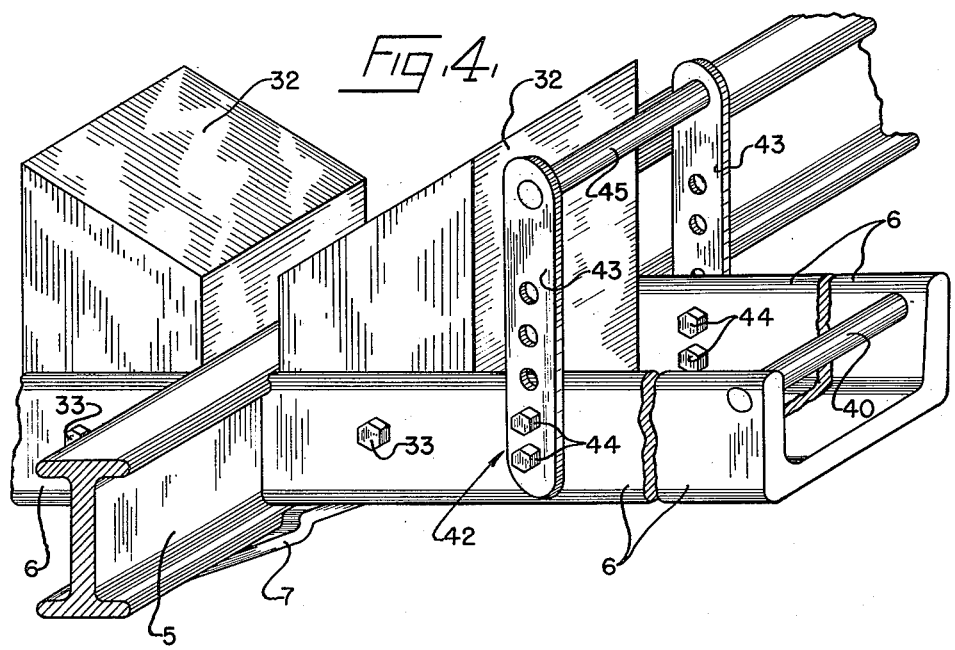
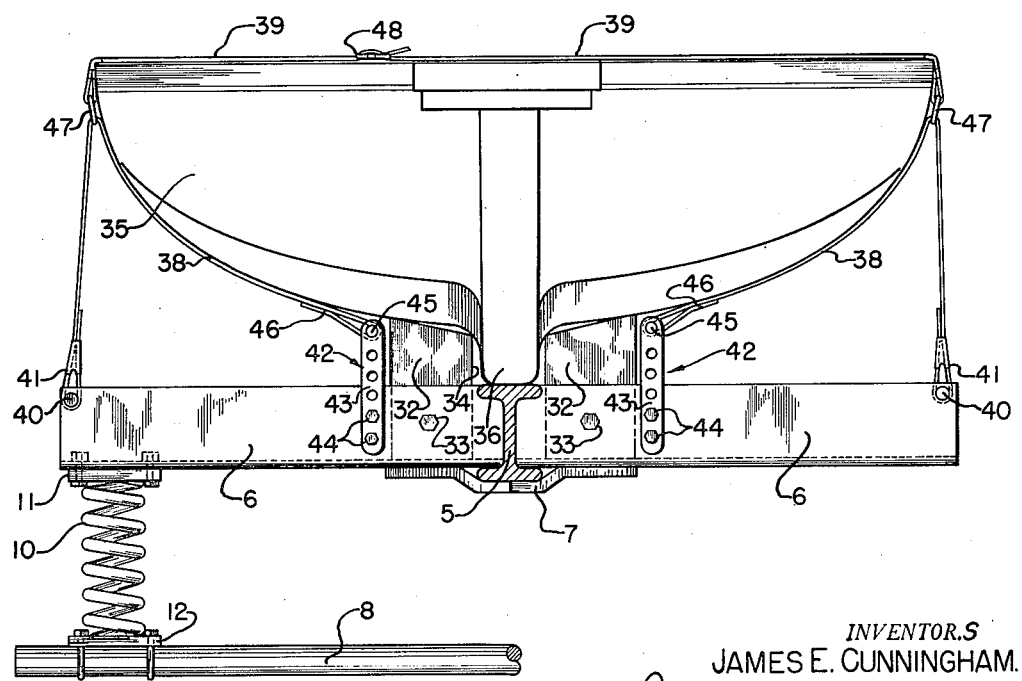

Patented Oct. 16, 1951

2,571,213

UNITED STATES PATENT OFFICE 2,571,213

BOAT TRAILER

James E. Cunningham and Donald R. Combs, East Liverpool, Ohio

Application May 29, 1947, Serial No. 751,250

11 Claims. (Cl. 214—84)

This invention relates to overland transportation of boats, and particularly to the transporting of various sizes and styles of hand propelled or outboard motor-powered boats from the place of the owner's residence to the locale of the lake, river or other waterway where the boat is to be launched.

The principal object of this invention is to provide for the convenient overland transportation and the launching and removal of a boat of the general type mentioned with a minimum amount of physical effort.

The invention resides in the provision of a trailer designed to achieve the above stated object of this invention, and to that end embodies certain details of construction and a combination and arrangement as will be hereinafter more specifically described with reference to the accompanying drawings wherein is illustrated a presently preferred embodiment of the invention, and in which:

Figure 1 is a side elevational view of a trailer embodying the features of this invention;

Figure 2 is a top plan view of the trailer;

Figure 3 is a rear elevational view thereof;

Figure 4 is an enlarged fragmentary perspective view illustrating certain details of construction hereinafter more specifically referred to; and Figure 5 is an enlarged fragmentary rear elevational view showing a boat mounted on the trailer, and illustrating a practicable application of the invention.

In the illustrated embodiment of the invention, the trailer comprises a frame formed of a longitudinal frame member 5, preferably in the form of an I-beam, and a cross frame member 6 in the form of aligned channel bars. These channel bars are secured at one end to longitudinal member 5 in any suitable manner, as by being welded thereto. The joint thus formed between members 5 and 6 is reinforced by a gusset plate 7 welded to the bottom faces of the frame members. Gusset plate 7 serves to secure I-beam 5 and channels 6 against any possible distortion due to weight or road usage, and is approximately of the same thickness as the material from which the I-beam and the channels are fabricated.

An axle 8 is located beneath the transverse member 6, and pneumatic wheels 9 are mounted on the axle. Interposed between axle 9 and channel frame members 6 are coil springs 10. These springs are carried in spring mounting brackets 11 and 12 mounted on the frame members 6 and the axle 8, respectively. Torque rods 13 hold the axle in position beneath frame members 6. These rods at one end are shaped to encircle or otherwise engage the axle 8, and at the opposite end are bolted to the longitudinal frame member 5 as indicated generally at 14.

A salient feature of this invention is the provision of a sway bar 15. This bar 15 (Figure 3) is of suitable size and strength to eliminate side sway of the trailer and is bolted at one end to bracket 16, bolted as at 17 to the underside of one of the channel members 6, and at an opposite end to bracket 18 secured by U-bolts 19 to axle 8. Brackets 16 and 18 are fabricated from form steel section, and bar 15 is of spring tempered steel.

Another important feature of this invention is the provision of an airplane type of shock absorber 20 (Figures 1 and 3). This shock absorber is pivoted at one end, as at 21, to a bracket 22 bolted or otherwise secured as at 23 to I-beam 5 rearwardly of cross member 6. At its lower end the shock absorber is pivoted as at 24 to a bracket 25 secured by U-bolts 26 to axle 8.

Referring now to the forward end of trailer frame member 5, it will be seen (Figure 1) that the same is tapered as at 26' to conform to the mounting dimensions of a trailer hitch 27 so that the trailer may be conveniently towed by an automobile or other draft vehicle. Preferably trailer hitch 27 is of welded steel construction and is bolted to beam 5 as at 28.

For loading and unloading a boat the trailer is equipped with a roller 29 journaled in a bracket 30 mounted on the extreme rear end of beam 5. This roller is preferably formed from a single blank of wood or other suitable material, and is of a size and shape to accommodate the keel of practically any style of boat of the general class hereinbefore referred to. Employed in connection with roller 29 is a winch 31 that is mounted on the beam 5 adjacent the front or forward end of the latter, and is advantageously employed for forcibly drawing the boat up onto the trailer over roller 29 by attaching the cable of the winch to the boat, and with the expenditure of a minimum amount of effort on the part of the operator.

To facilitate proper positioning of a boat on the trailer there are provided keel blocks 32, 32. By referring to Figures 3, 4 and 5 of the drawings, it will be seen that the keel blocks 32, which may be made of wood or other suitable material, are positioned within the channels of cross member 6 and in abutting relation with the I-beam 5. Bolts, wood screws or the like 33 are employed to removably secure the blocks 32. The top surfaces of the blocks 32 are inclined or otherwise shaped to conform to the surface contour of the boat, and at their confronting ends the blocks provide, in conjunction with the top flange of I-beam 5, a channel 34 that receives the keel of the boat. This is exemplified to advantage in Figure 5 wherein for illustrative purpose there is shown a boat 35 of conventional structure, and the keel thereof is indicated at 36. If desired the top surfaces of the blocks 32 may be covered with soft padding (not shown) to prevent damage to the bottom of the boat.

Complementing blocks 32 in supporting the boat on the trailer is a cradle bar 37 that is suitably secured to the beam 5 adjacent the forward end of the beam. Bar 37 extends transversely of beam 5 and secures the forward end of the boat from slipping from off of the trailer frame member 5.

This invention also comprehends a simple and efficient load securing means for firmly securing the boat in position on the trailer. By reference to Figures 3 and 5 of the drawings, it will be seen that the load securing straps 38, 38, and 39 coact with keel blocks 32 to provide a flexible floating cradle that readily conforms to the cross-sectional configuration of the boat and is adjustable to intimately embrace the boat to insure positive retention of the latter in position on the trailer. Transverse anchor rods 40 are secured between the walls or flanges of channel frame members 6 adjacent the outer or free ends of the latter, and are trained through terminal loops 41 of the straps 38. Mounted on the channel members 6 for vertical adjustment are brackets 42, each of which brackets comprises side standards 43 having apertures arranged in series lengthwise thereof to accommodate bolts 44 whereby the brackets are secured at the desired position of vertical adjustment, and a cross rod 45 supported between the upper ends of the standards 43 and welded or otherwise permanently secured thereto. The aforementioned straps 38 have loop ends 46 encircling the rods 45. Here it may be noted that brackets 42 are located in close proximity to keel blocks 32 (Figures 3, 4 and 5). Straps 38 are pulled into and secured in intimate contact with the bottom and sides of the boat by strap 39. Strap 39 is made up of two parts or sections that at one end are connected with straps 38 through the medium of slip-rings 47. One section of strap 39 is provided with a friction type buckle 48 through which the free end of the other section of the strap is trained for securing the strap 39 across the boat and the straps 38 against the bottom and sides of the boat so as to firmly hold the boat on the trailer frame. Each of straps 38, 39 is formed from a suitable length of heavy, wide webbing, although it will be understood that any other durable, flexible material may be used in the fabrication of the straps.

A trailer embodying the herein disclosed features of this invention has been found to be durable, capable of being economically constructed, to provide for convenient handling of a boat incidental to the launching, beaching and/or land transportation thereof, and to otherwise meet the requirements of a trailer vehicle designed for the purposes herein mentioned.

Although we have herein shown and described a preferred embodiment of this invention, it is to be understood that various changes may be made therein within the scope of the claims hereto appended.

What is claimed as new is:

1. In a trailer adapted to carry a boat or the like, a frame including a longitudinal member, and a cross member in the form of channel members extending laterally from opposite sides of the longitudinal member, keel blocks positioned in the channel members, and a load securing strap assembly having parts thereof anchored to the channel members in alignment with the keel blocks to form therewith a boat cradle, and other parts in free sliding engagement with the first mentioned parts and adapted to be passed around the boat and secured for firmly holding the boat in a position of rest on the keel blocks.

2. In a trailer adapted to carry a boat, a wheel-equipped frame, anti-sway and shock absorber means respectively secured to the frame and its wheel axle respectively, keel blocks on the frame to support the boat in a position of rest on the trailer frame, and a flexible strap assembly anchored to the frame in continuation of the keel blocks and adapted to be passed around the boat for firmly holding the latter on the keel blocks and provide therewith a flexible adjustable boat cradle.

3. A trailer for overland transporting of boats, comprising a wheel-equipped frame, laterally spaced keel blocks on the frame adapted to have a boat positioned thereon with the keel of the boat accommodated between the keel blocks, brackets adjustably mounted on the frame in proximity to the keel blocks, straps secured at one end to the frame remote from the keel blocks and having their respective opposite ends secured to the brackets, rings loosely embracing the straps, strap sections respectively secured at one end to the rings, said strap sections adapted to be extended across the top of the boat and secured together for firmly holding the latter in position.

4. In a trailer adapted to carry a boat, a frame including a longitudinal member and a cross channel, keel block means positioned in the cross channel for receiving the keel of a boat, straps connected at one end to the extremities of the cross channel and at the other end adjustably connected to the frame near the block means, and a buckle-equipped strap having one terminal portion in free-sliding engagement with one of the first named straps and the other terminal portion in free-sliding engagement with the other of the first named straps.

5. In a trailer, a frame including a cross member, cradle straps connected between the central portion and the end portions of the cross member, and a retaining strap of adjustable length having each of its terminal portions in free-sliding engagement with a different one of the cradle straps, whereby the straps may be made to conform with and securely grip an object of irregular shape carried on the trailer.

6. In a trailer having a cross-like frame formed of a longitudinal and a cross member and means on said frame for supporting a boat thereon; an axle positioned transversely beneath the said cross-like frame and coil springs spacing the said cross-like frame with respect to the said axle and secondary spring means spacing said cross-like frame and said axle and comprising a resilient bar normally disposed at an inclination substantially in a vertical plane through the axle and secured at one of its ends to the said cross member and at the other of its ends to the said axle.

7. In a trailer having a cross-like frame formed of a longitudinal and a cross member and means on the said cross member for supporting a boat thereon; springs affixed to the outermost ends of the said cross member and depending therefrom, and an axle positioned transversely of the said trailer and spaced with respect to the cross member thereof by the said springs, and a combination sway bar and secondary spring affixed to the said cross member and to the said axle and extending diagonally therebetween, torque members affixed to the said axle and to the said longitudinal member and a flexible strip assembly affixed to the ends of the said cross member for securing a boat on the said trailer, and rollers positioned at the rearmost end of the said longitudinal member and a winch positioned adjacent the foremost end of the said longitudinal member for loading a boat on the said trailer.

8. In a trailer having a cross-like frame formed of a longitudinal and a cross member and means on said frame for supporting a boat thereon; an axle positioned transversely beneath the said cross-like frame and springs spacing the said cross-like frame with respect to the said axle, and secondary spring means spacing said cross-like frame and said axle and comprising a resilient bar normally disposed in a vertical plane through the axle and secured at one end to said cross member and secured at its other end to the said axle, together with a pair of torque members secured to the said axle and to the longitudinal frame member.

9. In a trailer having a cross frame formed of a longitudinal and a cross member and means on the said cross member for supporting a boat thereon; springs affixed to the outermost ends of the said cross member and depending therefrom, and an axle positioned transversely of said trailer and spaced with respect to the cross member thereof by said springs, and secondary spring means spacing said cross-like frame and said axle and comprising a resilient bar normally disposed at an inclination substantially in a vertical plane through the axle and secured at one of its ends to the said cross member and at the other of its ends to said axle and extending therebetween inwardly of the connections of the first mentioned springs with said cross member, and torque members affixed to said axle and to the said longitudinal member.

10. In a trailer having a frame including a cross member, an axle member positioned beneath said cross member, springs affixed to the axle member and to the said cross member spacing the cross member with respect to the axle member, and a transversely disposed combination sway bar and secondary spring secured adjacent one end thereof to one of said members and secured adjacent its other end to the other of said members.

11. In a trailer having a frame including a cross member, an axle positioned beneath said cross member, springs spacing the cross member with respect to the axle interposed between end portions of the cross member and end portions of the axle, and a transversely disposed combination sway bar and secondary spring secured adjacent one end thereof to said cross member and secured adjacent its other end to the axle, and extending therebetween inwardly of the first mentioned springs.

JAMES E. CUNNINGHAM.
DONALD R. COMBS.

REFERENCES CITED

The following references are of record in the file of this patent:

UNITED STATES PATENTS

| Number | Name | Date |
|---|---|---|
| 210,527 | Harris | Dec. 3, 1878 |
| 1,459,521 | Wenneborg | June 19, 1923 |
| 1,691,633 | Bertram | Nov. 13, 1928 |
| 1,779,887 | Melanson | Oct. 28, 1930 |
| 2,077,710 | Pribil | Apr. 20, 1937 |
| 2,150,073 | Mallot | Mar. 7, 1939 |
| 2,211,083 | Smith | Aug. 13, 1940 |
| 2,217,871 | Lindgren | Oct. 15, 1940 |
| 2,219,401 | Sampsell | Oct. 29, 1940 |
| 2,256,038 | Woodruff | Sept. 16, 1941 |
| 2,374,383 | Sampsell | Apr. 24, 1945 |